Feb. 28, 1956 L. L. KAHLE 2,736,103
GAGE FOR CHECKING TAPERED THREADS
Filed June 4, 1953 2 Sheets-Sheet 1

INVENTOR.
LLOYD L. KAHLE
BY John N. Wolfram
ATTORNEY

Feb. 28, 1956    L. L. KAHLE    2,736,103
GAGE FOR CHECKING TAPERED THREADS
Filed June 4, 1953    2 Sheets-Sheet 2
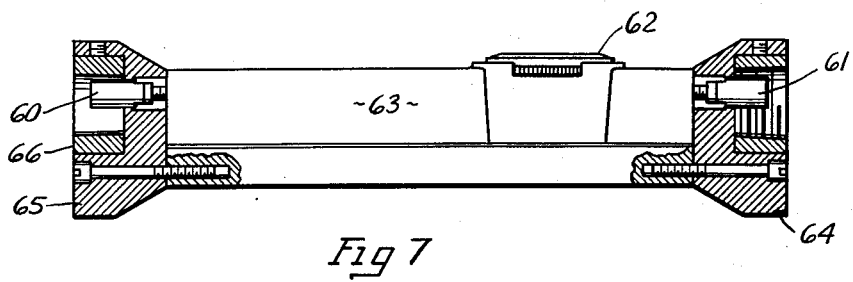
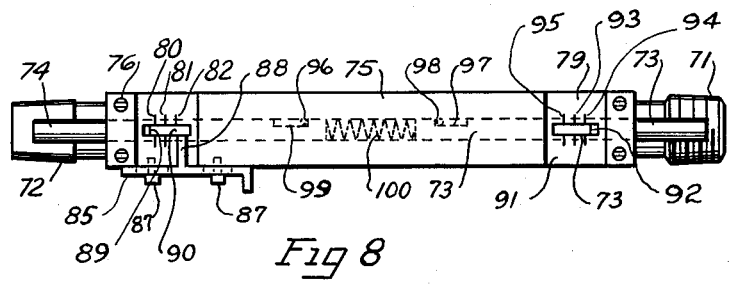
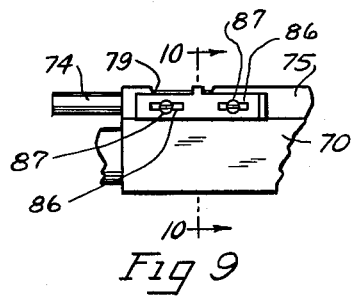    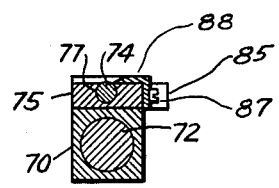
INVENTOR.
LLOYD L. KAHLE
BY John N. Wolfram
ATTORNEY United States Patent Office 2,736,103
Patented Feb. 28, 1956

2,736,103

GAGE FOR CHECKING TAPERED THREADS

Lloyd L. Kahle, Cleveland, Ohio

Application June 4, 1953, Serial No. 359,538

15 Claims. (Cl. 33—199)

This invention relates to gages for checking the pitch diameter and truncation of tapered threads. It is adaptable, with suitable modifications, for checking these characteristics on both internal and external threads.

With tapered pipe threads the pitch line is at an angle with respect to the axis of the thread so that the pitch diameter is smaller at one end of the thread than at the other. To check the pitch diameter on commercial threaded parts it is customary to engage externally threaded parts finger-tight into a ring gage having a correspondingly tapered internal thread and checking the distance the part enters the ring gage. Similarly, the pitch diameters of internally threaded parts are checked by measuring the distance the part can be threaded finger-tight onto an external taper threaded plug. In both cases it is customary to allow arbitrary variations, plus and minus, from the desired pitch diameter. The latter is referred to as the basic dimension and the plus and minus permissible variations are referred to as maximum and minimum diameters.

Truncation is the amount that the thread crests are flattened. This characteristic is customarily checked by observing how far the part, if externally threaded, will enter a ring gage having a smooth tapered bore, or if internally threaded, how far the part will pass over a smooth tapered plug.

With this type of gaging practice it is evident that two parts having the same truncation will give different readings on a truncation gage if the pitch diameters vary. Thus it is necessary that a correlation be established between the pitch diameter reading and the truncation readings. With commercial gaging equipment available until now this correlation is accomplished by having the inspector mentally note the length of engagement between the work piece and pitch gage relative to marks or steps on the gage indicating basic, minimum and maximum reference points. When the part is applied to the truncation gage, the inspector must then mentally transfer the pitch gage reading to the truncation gage and then note whether the truncation gage reading is within the permissible plus or minus variation from the mentally transferred, or imaginary, reading. Thus, for example, if the pitch diameter reading was maximum, the inspector must remember this after transferring the work piece to the truncation gage. The truncation reading can then vary the permissible minimum and maximum amounts from the reference point on the truncation gage marked "maximum." A disadvantage of this method is that the mental process involved leads to frequent errors through forgetting of the original reading, or of making an inaccurate transfer. Also, it requires considerable time for a person to learn how to properly use the gages and to acquire facility therewith.

The present invention overcomes these disadvantages by providing means for transferring the reading from the pitch diameter gage to the truncation gage, thus eliminating the mental process. This is accomplished by manually setting a reference member associated with the truncation gage to correspond with the reading on the pitch diameter gage.

The method of accomplishing the above and other objects is fully described below and is illustrated in the drawings, in which:

Figure 7 is a side elevation of the gage as modified for checking external threads.

Figure 8 is a plan view of a modified form for gaging internal threads.

Figure 9 is a fragmentary side elevation of Figure 8.

Figure 10 is a cross section along the lines 10—10 of Figure 9.

Figure 1:
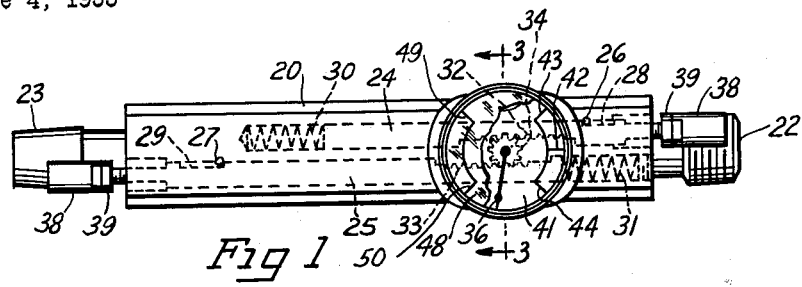
Figure 1 is a plan view, partially in broken section, of the invention adapted to check internal tapered threads.
Figure 2:
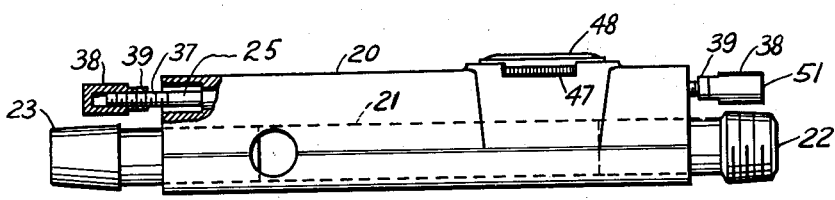
Figure 2 is a side elevation, partly in section of the form shown in Figure 1.

The form of the invention as shown in Figure 1 comprises a body or support member 20 having a bore 21 therethrough. A taper threaded adapter 22 is press fitted within the bore 21 at one end of the supporting member in fixed relation thereto. A plain tapered adapter 23 is press fitted into the bore at the opposite end. A pair of plungers 24 and 25 are slidably mounted in the supporting member 20 and are retained therein by pins 26 and 27 located in slots 28 and 29. The plungers are constantly urged outwardly by springs 30 and 31. The pins are in the body member and the slots are formed in the plungers. The pin extends into the slot and engages with the end of the slot as the shoulder when the plunger is released and the spring moves it outward to a normal position.

The inner ends of the plungers are provided with teeth 32 and 33 for engagement with a gear 34 mounted on a shaft 35. Attached to the shaft is a pointer 36. The arrangement is such that movement of either of the plungers 24 and 25 will cause the gear 34, and hence the pointer 36, to rotate.

The plunger 25 is preferably formed with a thread 37 at its outer end upon which a cap 38 may be mounted. The cap 38 may be adjustably positioned on the thread and locked in place by locknut 39. Plunger 24 is constructed in a similar manner.

Attached to the support member 20 is a plate 40. A dial face 41 is attached to this plate and has markings indicating basic, minimum and maximum reference points for the pitch diameter reading. These markings are indicated at 42, 43, and 44 respectively, of Figure 1. The plate 40 is undercut as at 45 for receiving a rotatable collar 46. Press fitted to the latter so as to rotate therewith is an annular ring 47, preferably having knurling on its outer surface so that the same may be readily rotated with the fingers.

Attached to the ring 47 is a transparent cover 48 of glass, plastic or other suitable material. The transparent cover has markings indicating a tolerance zone for truncation variation extending from a minimum to a maximum. The minimum marking is indicated at 49 and the maximum at 50 of Figure 1.

To use the gage of Figure 1, the operator initially adjusts the plunger 24 so that when the dial pointer 36 coincides with the reference mark 42, which indicates a "basic" reading, the end 51 of the plunger will be spaced a longitudinal distance away from the end of the threaded adapter 22 corresponding to the distance along the thread to be measured, that the basic pitch diameter should occur. This adjustment is made by means of the threaded cap 38 and locknut 39. The plunger 25 is then similarly adjusted so that when the dial pointer 36 coincides with the pitch diameter basic reference mark 42 the end of the plunger will be spaced the desired distance from the end of the adapter 23. In the form of the gage as shown this setting is made so that the distance from the end of the adapter 23 to the end of the cap 38 is the minimum (that is, it corresponds to the minimum truncation) when the pointer 36 is at the thread pitch basic reference mark 42. This permits simplification of the marking and use of the gage with reference to the truncation reading as will be more fully explained. However, the setting of plunger 25 can be made to correspond with the basic truncation value if desired.

Figure 4:
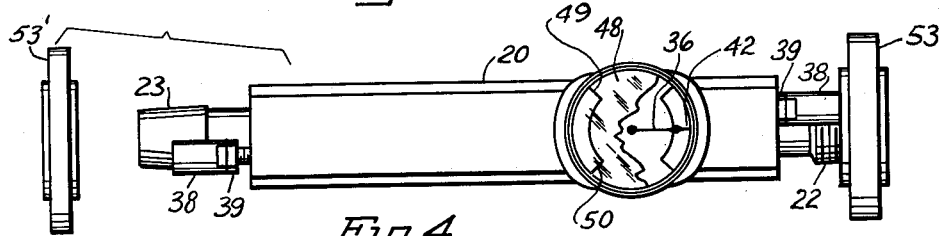
Figure 4 is a plan view showing how the initial setting of the calibrated parts is made.

These settings can be made by using a conventional threaded ring gage 53 on the threaded adapter and a smooth tapered truncation gage 53' on the plain adapter 23, as illustrated in Figure 4. The thickness of these gages corresponds to the above described distances from the ends of the adapters to the respective plunger end.

Figure 5:
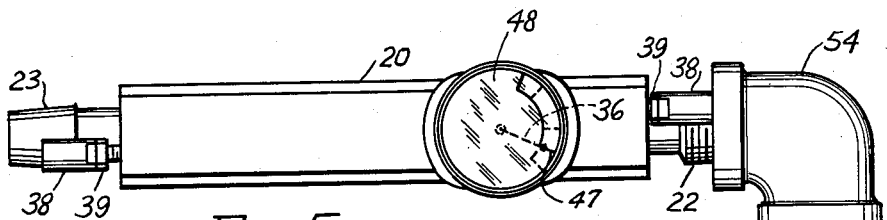
Figure 5 is a plan view showing a work piece on the threaded adapter.

To check a work piece 54, the latter is first threaded upon the adapter 22 as shown in Figure 5. When the work piece 54 reaches a finger-tight position it will have contacted the plunger 24 to move the same inwardly to rotate the pointer 36. When the work piece 54 stops at the finger-tight position the pointer 36 should be located somewhere between the minimum and maximum reference marks 43 and 44. If not, the inspector will know that the pitch diameter is not within tolerance limitations and will reject the part.

Figure 6:
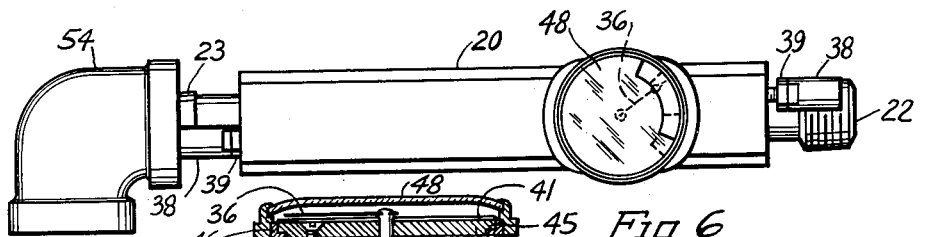
Figure 6 is a plan view showing the work piece transferred to the plain adapter.
Figure 3:
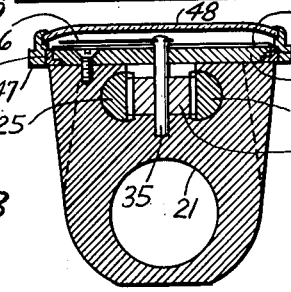
Figure 3 is an enlarged cross section along the lines 3—3 of Figure 1.

If the work piece 54 is within tolerance limitations, the inspector will then rotate the cover plate 48 by means of the knurled ring 47 until the "minimum truncation" reference line 49 on the cover plate is in alignment with the pointer 36. The work piece 54 is then removed from the adapter 22 and is applied to the smooth adapter 23, as shown in Figure 6. As the work piece is moved onto the smooth adapter 23 it contacts the plunger 25 to move the latter inwardly and consequently rotate the pointer 36. When the work piece 54 has been moved onto the adapter 23 as far as it will go the pointer 36 will stop at a point within the tolerance zone between the marks 49 and 50 on the cover plate 48 if truncation is within the permissible tolerance. If not within permissible tolerance the pointer 36 will stop outside of the tolerance zone and the inspector will reject the part.

Since in making the original setting the minimum truncation marking 49 was set to correspond with the pointer 36 when the latter was at the basic pitch diameter reference line 42, the permissible truncation tolerance zone will extend in only one direction from the line 49 and it is only necessary to define the maximum truncation reference line 50. In other words, it is not necessary to define a basic truncation reference line. This simplifies the marking and operation of the gage somewhat.

If desired, a third truncation reference line corresponding to basic truncation could be inserted between the lines 49 and 50. This line could then be set to correspond with the basic pitch diameter reference line 42 in making the original setting of the plunger 25 with respect to the end of the adapter 23. In such case this basic reference line would be set to correspond with the position of the pointer 36 when a work piece 54 is fully threaded upon the adapter 22. When the work piece is then transferred to the adapter 23 the pointer 36 must fall within the lines 49 and 50 if truncation is within tolerance.

In the form of gage shown in Figure 7 the arrangement of the plungers 60 and 61 and of the calibrated dial portion 62 is the same as that of Figure 1. The difference in the two figures is that in Figure 7 the supporting member 63 is provided with an internally threaded adapter 64 instead of the externally threaded adapter 22 of Figure 1. The other end of the support member 63 is provided with an adapter 65 having an internal tapered bore 66, rather than the externally tapered adapter 23 of Figure 1. By this means the gage is adapted to the checking of externally threaded work pieces. With these changes the operation of the gage is the same as that of Figure 1 and further detail description is not thought necessary.

Figure 8 illustrates an optional form of the gage which is generally the equivalent of Figure 1, although it does not possess all of the advantages of the latter. In this form, the support member 70 has a threaded adapter 71 mounted at one end and a smooth tapered adapter 72 at the other end. Plungers 73 and 74 are slidably mounted within a block 75 which is attached to the support member 70 by means of screws 76. One end of the block 70 is dished out as at 79 to a depth whereby the bore 77, in which the plunger 74 is mounted, is partially bisected to provide an opening 90 in the block 75, thus exposing the upper side of the inner end of the plunger 74. The surface of the dished out portion 79 is calibrated with markings 80, 81, and 82, which indicate minimum, basic, and maximum reference points for a tolerance zone in connection with the checking of the truncation of the work piece.

Attached to the side of the block 75 is an indicator element 85 having a pair of elongated slots 86. Screws 87 retain the indicator upon the block in frictional contact therewith so that the indicator can be manually moved but will retain its set position. The indicator has a finger 88 extending partially across the dished out portion 79 of the block 75 and is of a width corresponding to the truncation tolerance. In other words, a work piece of maximum truncation can be moved on to the smooth adapter 72 a distance greater than can a work piece of minimum truncation. The width of the finger 88 corresponds to the difference in these two distances. The upper surface of the plunger 74 has a reference line 89 which is visible through the opening 90.

The other end of the block 75 also has a dished out portion 91 exposing a reference line 92 on the upper surface of the plunger 73. Also the dished out portion is provided with reference markings 93, 94, and 95 for indicating basic, minimum, and maximum pitch diameters respectively.

The inner end of the plunger 74 has a slot 99 across which a pin 96 extends for retaining the plunger within the member 70. Likewise the plunger 73 has a slot 97 and a pin 98 associated therewith. A spring 100 is interposed between the inner ends of the plungers for normally urging the same outwardly.

The gage may be initially calibrated by the following method. A threaded ring gage similar to 53 of Figure 4 having a thread of basic pitch diameter and a width corresponding to the same is threaded onto the adapter 71, thereby engaging the plunger 73 to move the latter inwardly against the action of the spring 100. Reference line 92 is then inscribed upon the plunger 73. Basic pitch diameter reference line 93 is then inscribed on block 75 opposite line 92. Minimum and maximum reference lines 94 and 95 are then inscribed on block 75 at distances from basic reference line 93 corresponding to the permissible variation in pitch diameter.

A truncation ring gage similar to 54 having a tapered bore and a thickness corresponding to the minimum truncation at basic pitch diameter, is then placed on the adapter 72. The ring gage 54 will thereby move the plunger 74 inwardly against the spring 100. When the ring gage 54 is in position on the adapter 72 the reference line 89 is then inscribed upon the plunger 74 and the minimum truncation line 80 is inscribed on the block 75 opposite line 89. The basic truncation marking 81 is then inscribed at a distance from line 80 corresponding to the total permissible variation in truncation. The maximum truncation marking 82 is then inscribed at a distance from the basic marking 81 corresponding to the total permissible variation in truncation.

To use the gage of Figure 8 a work piece is first threaded upon the plug 71. If the pitch diameter is within tolerance the reference marking 92 will fall between the minimum and maximum markings 94 and 95. The position of the marking 92 with respect to the markings 93, 94, and 95 must then be noted. The operator then moves the slider 85 so that the left side of the finger 88 is at a position with respect to the markings 80, 81, and 82 corresponding to the position of the marking 92 with respect to the markings 93, 94, and 95. For example, if the work piece caused the marking 92 to fall halfway between the basic line 93 and the minimum line 94, the left side of the finger 88 will be placed half way between the basic truncation marking 81 and minimum marking 80.

The work piece is then moved onto the smooth adapter 72. The plunger 74 is moved inwardly thereby and if the truncation is within tolerance the marking 89 will fall within the left and right side of the finger 88.

It is obvious that the form of gage shown in Figure 8 may be readily adapted for use with work pieces having external threads by substituting ends similar to 64 and 65 of Figure 7 for the adapter 71 and 72.

One advantage of the form of the invention illustrated in Figure 1 over that shown in Figure 8 is that the distance between the pitch diameter reference markings 42, 43, and 44 and the truncation markings 49 and 50 can be amplified to any desired extent by varying the number of teeth and pitch diameter of the gear wheel 34 and/or increasing the diameter of the plates 40 and 48 upon which the markings are made. Another advantage is that it permits the setting of the truncation markings directly with respect to the pointer 36 and omits the necessity in Figure 8 of mentally noting the position of the marking 92 and setting the finger 88 accordingly.

I claim:

1. In a device for checking the characteristics of a tapered thread on a work piece, a body, a taper threaded adapter attached to the body and upon which a work piece may be threaded, a first abutment member mounted on the body and movable by contact with the work piece when the latter is on the threaded adapter, a second adapter having a plain tapered surface attached to the body and upon which the work piece may be transferred, a second abutment member mounted on the body and movable by contact with the work piece when the latter is on the second adapter, calibration means on the body, reference means including an indicator associated with the first abutment member cooperating with the calibrations for indicating the relative position of the work piece upon the threaded adapter, means mounted on the body defining a tolerance zone, said tolerance zone means being settable to a position corresponding with said relative position indicated by said reference means indicator, and additional reference means including said indicator associated with the second abutment member and movable therewith relative to the tolerance zone.

2. In a device for checking the characteristics of a tapered thread on a work piece, a body, a taper threaded adapter attached to the body and upon which a work piece may be threaded, a first abutment member mounted on the body and movable by contact with the work piece when the latter is on the threaded adapter, a second adapter having a plain tapered surface attached to the body and upon which the work piece may be transferred, a second abutment member mounted on the body and movable by contact with the work piece when the latter is on the second adapter, calibration means on the body, reference means including an indicator associated with the first abutment member cooperating with the calibrations for indicating the relative position of the work piece upon the threaded adapter, means mounted on the body defining a tolerance zone, said tolerance zone means being settable to a position corresponding with said relative position indicated by said reference means indicator, and additional reference means including said indicator associated with the second abutment member and movable therewith relative to the tolerance zone, said abutment members being spring pressed toward the work piece when the latter is on the respective threaded or plain adapter.

3. In a device for checking the characteristics of a tapered thread on a work piece, a body, a taper threaded adapter attached to the body and upon which a work piece may be threaded, a first abutment member mounted on the body and movable by contact with the work piece when the latter is on the threaded adapter, a second adapter having a plain tapered surface attached to the body and upon which the work piece may be transferred, a second abutment member mounted on the body and movable by contact with the work piece when the latter is on the plain adapter, calibration means on the body, reference means including an indicator associated with the first abutment member cooperating with the calibrations for indicating the relative position of the work piece upon the threaded adapter, means mounted on the body defining a tolerance zone, said tolerance zone means being settable to a position corresponding with said relative position indicated by said reference means indicator, and additional reference means including said indicator associated with the second abutment member and movable therewith relative to the tolerance zone, the reference means for each abutment member being initially adjustable with respect to said calibrations and said adapters.

4. In a device for checking the characteristics of a tapered thread on a work piece, a body, a taper threaded adapter attached to the body and upon which a work piece may be threaded, a first plunger mounted on the body and movable by contact with the work piece when the latter is on the threaded adapter, a second adapter having a plain tapered surface attached to the body and upon which the work piece may be transferred, a second plunger mounted on the body and movable by contact with the work piece when the latter is on the plain adapter, calibration means on the body defining minimum and maximum reference points, reference means including an indicator associated with the first plunger cooperating with the minimum and maximum reference points for indicating the relative position of the work piece upon the threaded adapter, means mounted on the body defining a tolerance zone, said tolerance zone means being settable to a position corresponding with said relative position indicated by said reference means indicator, and additional reference means including said indicator associated with the second plunger and movable therewith relative to the tolerance zone.

5. In a device for checking the characteristics of a tapered thread on a work piece, a body, a taper threaded adapter attached to the body and upon which a work piece may be threaded, a first plunger mounted on the body and movable by contact with the work piece when the latter is on the threaded adapter, a second adapter having a plain tapered surface attached to the body and upon which the work piece may be transferred, a second plunger mounted on the body and movable by contact with the work piece when the latter is on the plain adapter, calibration means on the body, reference means including an indicator associated with the first plunger cooperating with the calibrations for indicating the relative position of the work piece upon the threaded adapter, means mounted on the body defining a tolerance zone, said tolerance zone means being settable to a position corresponding with said relative position indicated by the first reference means indicator, and additional reference means including said indicator associated with the second plunger and movable therewith relative to the tolerance zone, and means for retaining the plungers on the body when the work piece is removed from the adapters.

6. In a device for checking the characteristics of a tapered thread on a work piece, a body, a taper threaded adapter attached to the body and upon which a work piece may be threaded, a first plunger mounted on the body and movable by contact with the work piece when the latter is on the threaded adapter, a second adapter having a tapered surface attached to the body and upon which the work piece may be transferred, a second plunger mounted on the body and movable by contact with the work piece when the latter is on the plain adapter, calibration means on the body, reference means including an indicator associated with the first plunger cooperating with the calibrations for indicating the relative position of the work piece upon the threaded adapter, means mounted on the body defining a tolerance zone, said tolerance zone means being settable to a position corresponding with said relative position indicated by said reference means indicator, and additional reference means including said indicator associated with the second plunger and movable therewith relative to the tolerance zone, and means for adjusting the relationship between the respective reference means and the portion of the plungers contacted by the work piece.

7. In a device for checking the characteristics of a tapered thread on a work piece, a body, a taper threaded adapter attached to the body and upon which a work piece may be threaded, a first plunger mounted on the body and axially movable by contact with the work piece when the latter is on the threaded adapter, a second adapter having a plain tapered surface attached to the body and upon which the work piece may be transferred, a second plunger mounted on the body and axially movable by contact with the work piece when the latter is on the plain adapter, calibration means on the body, reference means including an indicator associated with the first plunger cooperating with the calibrations for indicating the relative position of the work piece upon the threaded adapter, means mounted on the body defining a tolerance zone, said tolerance zone means being settable to a position corresponding with said relative position indicated by said reference means indicator, and additional reference means including said indicator associated with the second plunger and movable therewith relative to the tolerance zone.

8. In a device for measuring the characteristics of a tapered thread on a work piece, a body, a taper threaded adapter attached to the body and upon which a work piece may be threaded, a first plunger mounted on the body and axially movable by contact with the work piece when the latter is on the threaded adapter, a second adapter having a plain tapered surface attached to the body and upon which the work piece may be transferred, a second plunger mounted on the body and axially movable by contact with the work piece when the latter is on the plain adapter, calibration means on the body, reference means including an indicator associated with the first plunger cooperating with the calibrations for indicating the relative position of the work piece upon the threaded adapter, means mounted on the body defining a tolerance zone, said tolerance zone means being settable to a position corresponding with said relative position indicated by said reference means indicator, and additional reference means including said indicator associated with the second plunger and movable therewith relative to the tolerance zone, a shoulder on each abutment member, and retaining members carried by the body and associated with respective shoulders on the plungers for limiting the outward movement of the respective plunger.

9. In a device for checking the characteristics of a tapered thread on a work piece, a body, a taper threaded adapter attached to the body and upon which a work piece may be threaded, a first plunger slidably mounted on the body and axially overlapping the threaded adapter whereby it will be contacted by the work piece and moved axially inwardly thereby when the work piece is threaded onto the threaded adapter, a second adapter having a plain tapered surface attached to the body and upon which the work piece may be transferred, a second plunger slidably mounted on the body and axially overlapping the plain tapered adapter whereby it will be contacted and moved axially inwardly by the work piece when the latter is moved onto the plain adapter, calibration means on the body, reference means including an indicator associated with the first plunger cooperating with the calibrations for indicating the relative position of the work piece upon the threaded adapter, means mounted on the body defining a tolerance zone, said tolerance zone means being settable to a position corresponding with said relative position indicated by said reference means indicator, and additional reference means including said indicator associated with the second plunger and movable therewith relative to the tolerance zone.

10. In a device for checking the characteristics of a tapered thread on a work piece, a body, a tapered threaded adapter attached to the body and upon which a work piece may be threaded, a first abutment member mounted on the body and movable by contact with the work piece when the latter is on the threaded adapter, a second adapter having a plain tapered surface attached to the body and upon which the work piece may be transferred, a second abutment member mounted on the body and movable by contact with the work piece when the latter is on the second adapter, a first calibrated dial fixed to the body, a pointer carried by the body, said first abutment member having means associated therewith for rotating the pointer with respect to the first calibrated dial, a second calibrated dial mounted on the body and settable with respect to the pointer, said second abutment member having means for rotating the pointer with respect to the second dial.

11. In a device for checking the characteristics of a tapered thread on a work piece, a body, a taper threaded adapter attached to the body and upon which a work piece may be threaded, a first abutment member mounted on the body and movable by contact with the work piece when the latter is on the threaded adapter, a second adapter having a plain tapered surface attached to the body and upon which the work piece may be transferred, a second abutment member mounted on the body and movable by contact with the work piece when the latter is on the second adapter, a first calibrated dial fixed to the body, a gear mechanism associated with the plungers and rotatable by movement of said plungers, a pointer carried by the gear mechanism and rotatable therewith with respect to the calibrated dial, a second calibrated dial mounted on the body and settable with respect to the pointer.

12. In a device for checking the characteristics of a tapered thread on a work piece, a body, a taper threaded adapter attached to the body and upon which a work piece may be threaded, a first plunger mounted on the body and movable by contact with the work piece when the latter is on the threaded adapter, a second adapter having a plain tapered surface attached to the body and upon which the work piece may be transferred, a second plunger mounted on the body and movable by contact with the work piece when the latter is on the plain adapter, a first calibrated dial fixed to the body, a gear wheel carried by the body, each of said plungers having a gear rack engageable with the gear wheel for rotating the same, a pointer rotatable by the gear wheel with respect to the first dial, a second calibrated dial mounted on the body and manually settable with respect to the pointer.

13. In a device for checking the characteristics of a tapered thread on a work piece, a body, a taper threaded adapter attached to the body and upon which a work piece may be threaded, a first plunger mounted on the body and movable by contact with the work piece when the latter is on the threaded adapter, a second adapter having a plain tapered surface attached to the body and upon which the work piece may be transferred, a second plunger mounted on the body and movable by contact with the work piece when the latter is on the plain adapter, a first calibrated dial fixed to the body, a gear wheel carried by the body, each of said plungers having a gear rack engageable with the gear wheel for rotating the same, a pointer rotatable by the gear wheel with respect to the first dial, a second calibrated dial mounted on the body and manually settable with respect to the pointer, said plungers being spring pressed toward the respective adapter.

14. In a device for checking the characteristics of a tapered thread on a work piece, a body, a taper threaded adapter attached to the body and upon which a work piece may be threaded, a first plunger mounted on the body and movable by contact with the work piece when the latter is on the threaded adapter, a second adapter having a plain tapered surface attached to the body and upon which the work piece may be transferred, a second plunger mounted on the body and movable by contact with the work piece when the latter is on the plain adapter, a first calibrated dial fixed to the body, a gear wheel carried by the body, each of said plungers having a gear rack engageable with the gear wheel for rotating the same, a pointer rotatable by the gear wheel with respect to the first dial, a second calibrated dial mounted on the body and manually settable with respect to the pointer, said plungers being pressed toward the respective adapter, each of said plungers having a longitudinal slot, means carried by the body and extending into the respective slots for retaining the plungers on said body.

15. In a device for checking the characteristics of a tapered thread on a work piece, a body, a taper threaded adapter attached to the body and upon which a work piece may be threaded, a first plunger mounted on the body and movable by contact with the work piece when the latter is on the threaded adapter, a second adapter having a plain tapered surface attached to the body and upon which the work piece may be transferred, a second plunger mounted on the body and movable by contact with the work piece when the latter is on the plain adapter, a first calibrated dial fixed to the body, a gear wheel carried by the body, each of said plungers having a gear rack engageable with the gear wheel for rotating the same, a pointer rotatable by the gear wheel with respect to the first dial, a second calibrated dial mounted on the body and manually settable with respect to the pointer, said second dial being of transparent material and superimposed over said first dial.

References Cited in the file of this patent

UNITED STATES PATENTS

| | | |
|---|---|---|
| 1,530,067 | Young | Mar. 17, 1925 |
| 1,602,645 | Buckingham | Oct. 12, 1926 |
| 1,706,513 | Baines et al. | Mar. 26, 1929 |
| 1,723,390 | Tingley | Aug. 6, 1929 |
| 2,218,111 | Johnson | Oct. 15, 1940 |
| 2,296,104 | Handley | Sept. 15, 1942 |
| 2,330,453 | Smith | Sept. 28, 1943 |
| 2,339,699 | Husband | Jan. 18, 1944 |

FOREIGN PATENTS

| | | |
|---|---|---|
| 170,306 | Germany | May 4, 1906 |